(12) United States Patent
Endo et al.

(10) Patent No.: US 6,758,183 B2
(45) Date of Patent: Jul. 6, 2004

(54) JOINT STRUCTURE FOR OIL PUMP SHAFT AND BALANCER SHAFT

(75) Inventors: Yusuke Endo, Saitama (JP); Hirotsugu Kudo, Saitama (JP); Kenji Fujiki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 28 days.

(21) Appl. No.: 10/315,947

(22) Filed: Dec. 11, 2002

(65) Prior Publication Data

US 2003/0110940 A1 Jun. 19, 2003

(30) Foreign Application Priority Data

Dec. 13, 2001 (JP) ........................................ 2001-380541

(51) Int. Cl.$^7$ .............................................. F02B 75/06
(52) U.S. Cl. ................. 123/192.2; 123/196 R
(58) Field of Search .................. 123/192.2, 196 R, 123/198 C

(56) References Cited

U.S. PATENT DOCUMENTS 6,079,383 A 6/2000 Shirai et al.
6,189,499 B1 2/2001 Iwata et al.

FOREIGN PATENT DOCUMENTS

| EP | 0 979 957 A2 | 2/2000 |
| EP | 1 081 345 A1 | 3/2001 |
| JP | 2000-65148 | 3/2000 |

*Primary Examiner*—Noah P. Kamen
(74) *Attorney, Agent, or Firm*—Armstrong, Kratz, Quintos, Hanson & Brooks, LLP

(57) ABSTRACT

A joint portion 33 of an oil pump shaft 19 and a balancer shaft (output-side balancer shaft 12) is provided in an open space between opposite surfaces of a sidewall 4b of an oil pump housing 4 and a sidewall 5c1–5c2 (a bearing portion) of a balancer shaft housing 5. The joint portion 33 of the oil pump shaft 19 and the balancer shaft 12 is comprised of a pair of engageable portions 33a, 33b provided at each end of the balancer shaft 12 and the oil pump shaft 19, respectively. The engageable portions 33a, 33b are disengageably engaged with each other in radial directions of the shafts 12, 19. The joint portion 33 can be seen from the outside, and thus a joining operation can be performed with ease.

7 Claims, 8 Drawing Sheets

JOINT STRUCTURE FOR OIL PUMP SHAFT AND BALANCER SHAFT

BACKGROUND OF THE INVENTION

This invention relates to joint structures for an oil pump shaft and a balancer shaft, and more particularly to a joint structure for an oil pump shaft and a balancer shaft with which a joint thereof can be seen from the outside.

In a conventional joint structure for an oil pump shaft and a balancer shaft, two balancer shafts and an oil pump shaft are arranged in parallel with one another. A driving sprocket fixed on an end portion of a crankshaft of an engine is connected with a driven sprocket fixed on one of the balancer shafts (hereinafter referred to as input-side balancer shaft) through an endless chain, and thereby a driving force from the crankshaft is transmitted to the input-side balancer shaft. Thus-transmitted driving force is in turn transmitted from the input-side balancer shaft to the other balancer shaft (hereinafter referred to as output-side balancer shaft) through gears fixed on the both balancer shafts and engaged with each other to synchronously rotate.

The oil pump shaft that is joined to the output-side balancer shaft is thus driven to rotate together with the output-side balancer shaft, and as the oil pump shaft rotates, an inner rotor of an oil pump provided integrally with the oil pump shaft also rotates accordingly. With the inner rotor of the oil pump rotating, reservoir oil stored in an oil pan is supplied to each section of the engine, which includes the input-side balancer shaft, the output-side balancer shaft, the oil pump shaft, and the crankshaft.

A ratio of the number of teeth of the driving sprocket to that of the driven sprocket is 2:1, whereas a gear ratio of the gears of each balancer shaft is 1:1. Accordingly, the input-side balancer shaft and the output-side balancer shaft are driven to rotate twice as high a rotational speed as the crankshaft.

As a result, plural weights of which the centers of gravity are shifted from the center of rotation of each balancer shaft are driven to rotate at an angular speed twice as fast as the crankshaft, producing a reverse force that serves to cancel a secondary oscillation of the engine derived from reciprocating motion of a piston of the engine.

As shown in FIG. 8, an oil pump 110 as one example of the above-described conventional arrangement includes a joint shaft 115 made by integrally joining an input shaft portion 115a for driving an inner rotor 111 to rotate, and an output-side balancer shaft 115b. The input shaft portion 115a of the joint shaft 115 is inserted from the direction of a balancer shaft housing 112 with an upper balancer shaft housing 112a thereof detached from a lower balancer shaft housing 112b thereof, and is fitted into an bearing hole 113 of an oil pump housing 110a. The inner rotor 111 is then mounted on the input shaft portion 115a of the oil pump 110; thereafter, the upper balancer shaft housing 112a and an oil pump cover 110b are attached to the lower balancer shaft housing 112b and the oil pump housing 110a, respectively.

However, with the conventional joint structure as discussed above, a joint portion where the inner rotor 111 and the input shaft portion 115a are joined together is hidden behind the oil pump housing 110a and the balancer shaft housing 112, and thus disadvantageously cannot be seen from the outside; consequently, the input shaft portion (oil pump shaft) 115a and the output-side balancer shaft (balancer shaft) 115b could not be joined together with ease.

Therefore, the present invention has been made in order to eliminate the aforementioned disadvantages.

SUMMARY OF THE INVENTION

It is an exemplified general object of the present invention to provide a joint structure for an oil pump shaft and a balancer shaft in which a joint portion of the oil pump shaft and the balancer shaft can be seen from the outside.

According to one exemplified aspect of the present invention, there is provided a joint structure for an oil pump shaft and a balances shaft in which the balancer shaft supported in a bearing portion is coaxially joined to an end portion of the oil pump shaft protruding from an oil pump housing. A housing joint portion that joins the oil pump housing and the bearing portion with a predetermined spacing allowed therebetween is provided below a shaft joint portion where the oil pump shaft and the balancer shaft join together. The above predetermined spacing is set so that the shaft joint portion is disposed between opposed surfaces of the oil pump housing and the bearing portion.

With this joint structure, space between the oil pump housing and the bearing portion is open to an operator, so that the operator can join the oil pump shaft and the balancer shaft together while seeing the end portion of the oil pump shaft from the outside.

Preferably, the shaft joint portion is comprised of a pair of engageable portions of the oil pump shaft and the balancer shaft, and the engageable portions are engageable with each other in a radial direction thereof. A pair of protuberances that guide the engageable portion of the balancer shaft to the engageable portion of the oil pump shaft to make the engageable portions engaged with each other may be provided on the surface of the oil pump housing opposite to the bearing portion of the balancer shaft in such a manner that the protuberances sandwich the end portion of the oil pump shaft.

This structure allows the opposed surfaces of the protuberances to guide the engageable portion of the balancer shaft toward the engageable portion of the oil pump shaft so that these engageable portions may be engaged with each other, and thus facilitates the joining operation of the engageable portions of the oil pump shaft and the balancer shaft.

Moreover, the above pair of protuberances may preferably be designed to lap the engageable portion of the balancer shaft in axial directions of the balancer shaft.

This structure has the oil pump housing formed utilizing space at both sides of the balancer shaft, and thus can realize a compact and lightweight body of the oil pump.

The above bearing portion may preferably be designed to be separable into a first part and a second part, so that only attaching the second part to the first part provided with the housing joint portion after engaging the balancer shaft with the oil pump shaft can finalize a joining operation of the oil pump shaft and the balancer shaft, and thus can considerably improve total operating efficiency.

The above first and second parts of the bearing portion may be fastened together with a bolt fitted in a boss provided outside the protuberances. Provision of the boss outside the protuberances allows the operator to more easily perform the operation of fitting the engageable portion of the balancer shaft into the engageable portion of the oil pump shaft.

The above joint structure for an oil pump shaft and a balancer shaft may further includes a pump cover openably attached to the oil pump housing, a tubular oil discharge port provided in the pump cover, and a tensioner that provides a predetermined level of tension to an endless chain in a gearing for transmitting a driving force from a crank shaft of an engine to the oil pump shaft, whereas a tensioner body of the tensioner is integrally mounted on a tensioner mount portion that is integrally formed on a periphery of the tubular oil discharge port. This construction can serve to reinforce the pump cover, particularly the tubular oil discharge port thereof, thanks to the tensioner mount portion integrally formed with the oil discharge port.

The oil discharge port may preferably be formed to have an outlet thereof oriented in a direction perpendicular to a longitudinal direction of the engine and to have a shape compressed in the longitudinal direction of the engine. With this construction, an amount of overhanging of the endless chain can be reduced, so that a compact structure thereof can be achieved.

Other objects and further features of the present invention will become readily apparent from the following description of preferred embodiments with reference to accompanying drawings.

DETAILED DESCRIPTION OF THE PREFERRED EMBODIMENTS

A description will be given of one exemplified embodiment of the present invention with reference to FIGS. 1 through 7.

Figure 1:
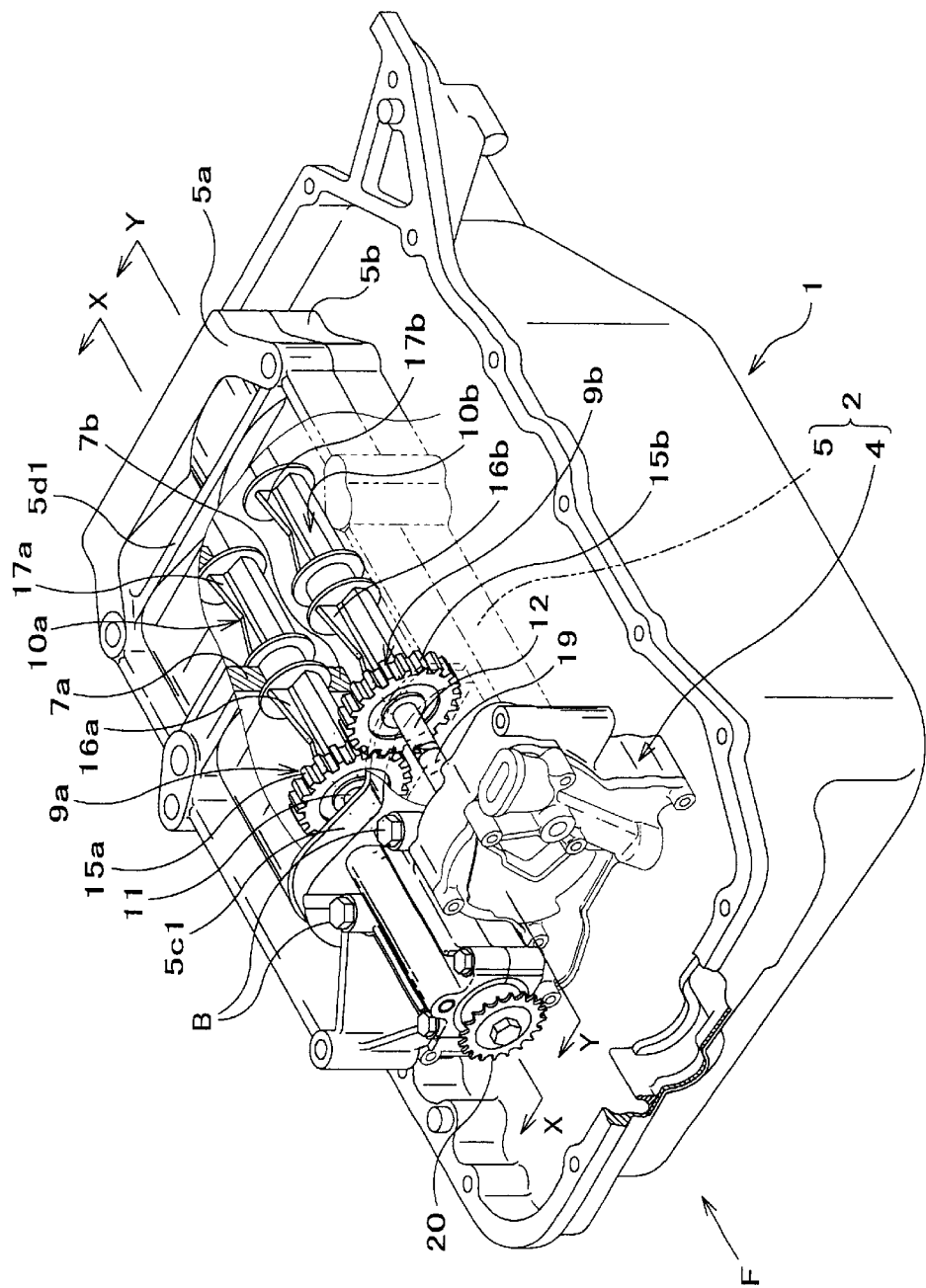
FIG. 1 is an exploded perspective view, partially broken away, of a housing including an oil pump shaft and a balancer shaft, and an oil pan accommodating the housing according to one embodiment of the present invention.
Figure 2:
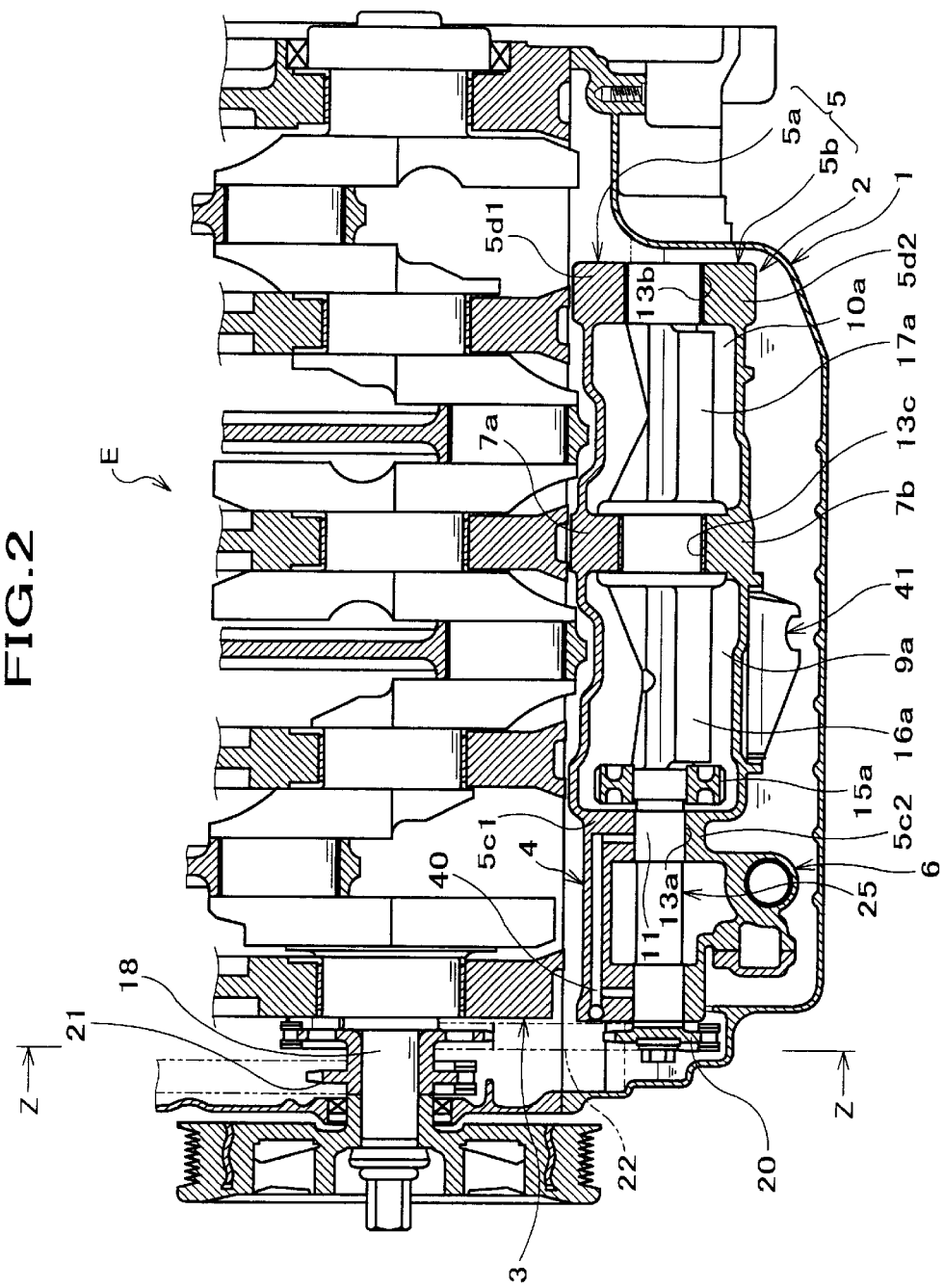
FIG. 2 is a cross section of the housing and the oil pan, as taken along line X—X of FIG. 1, and an engine to which the housing and the oil pan are attached.
Figure 3:
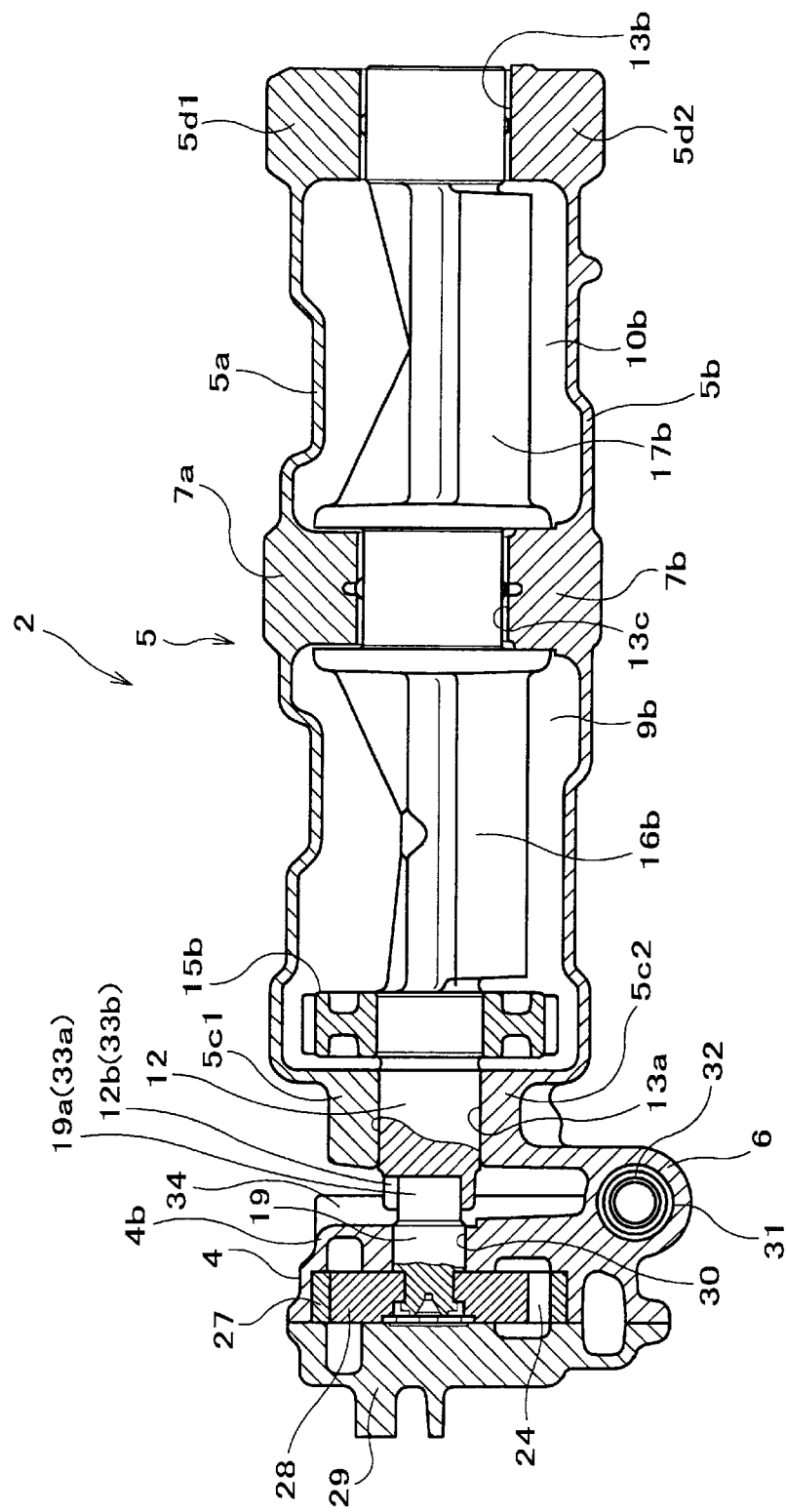
FIG. 3 is a cross section of the housing taken along line Y—Y of FIG. 1.

Referring now to FIGS. 1 through 3, a general structure of a housing containing balancer shafts and oil pump parts will be described in detail.

FIG. 1 is an exploded perspective view, partially broken away, of a housing including an oil pump shaft and a balancer shaft, and an oil pan accommodating the housing. FIG. 2 is a cross section of the housing and the oil pan, as taken along line X—X of FIG. 1, and an engine to which the housing and the oil pan are attached. FIG. 3 is a cross section taken along line Y—Y of FIG. 1.

As shown in FIG. 2, an oil pan 1 and a housing 2 are mounted on a bottom surface of a crank case 3 of an engine E, and the housing 2 is contained in the oil pan 1. The housing 2 is comprised of an oil pump housing 4, a balancer shaft housing 5, and a housing joint portion 6. The oil pump housing 4 incorporates oil pump parts (as will be described later). The housing joint portion 6 joins the oil pump housing 4 and the balancer shaft housing 5 with a predetermined spacing allowed therebetween.

Figure 5:
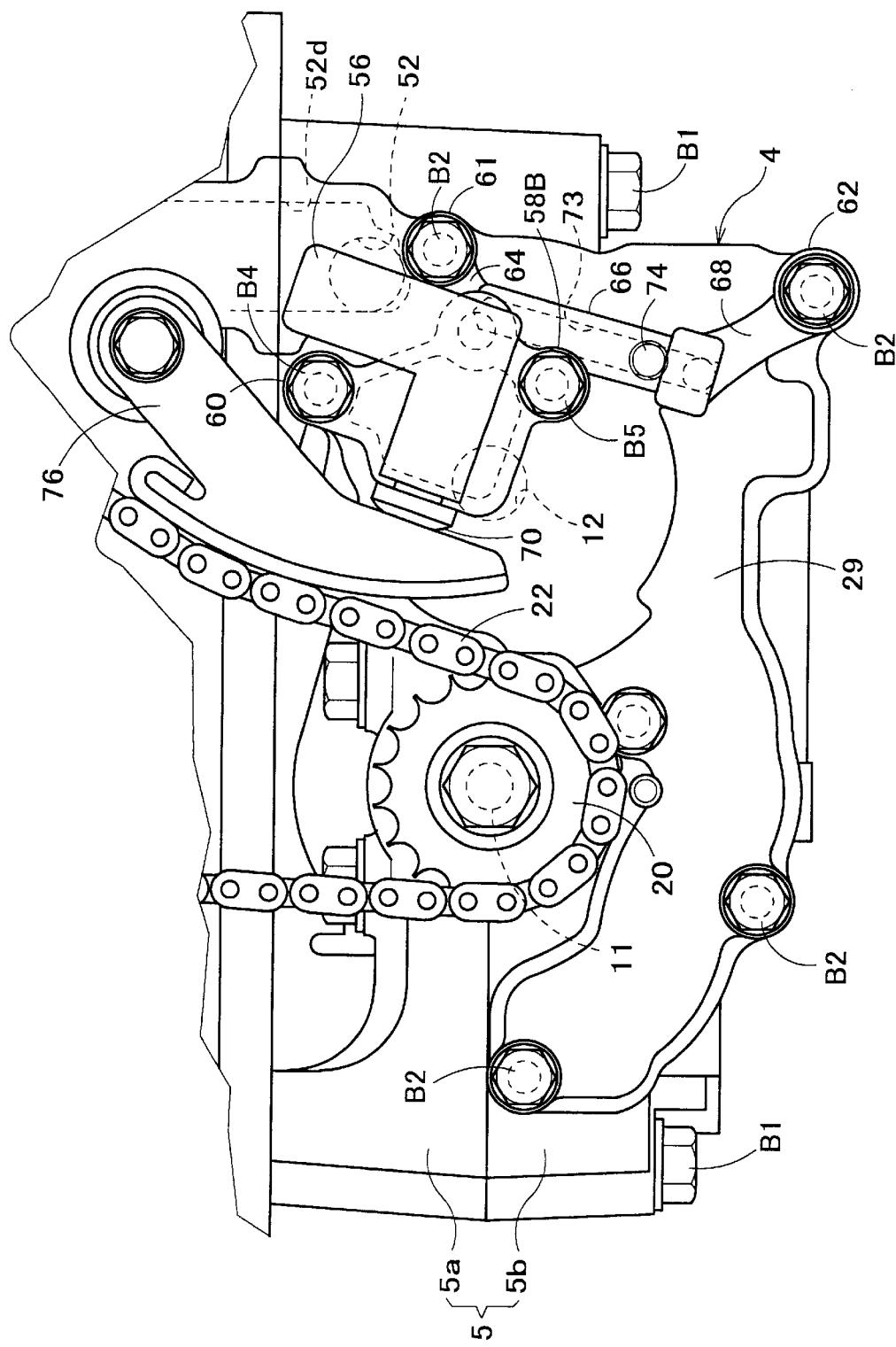
FIG. 5 is a front elevation of the housing attached to the engine, as viewed from the direction indicated by an arrow F in FIG. 1, with an endless chain wrapped on a sprocket, and a tensioner attached to the housing.
Figure 6:
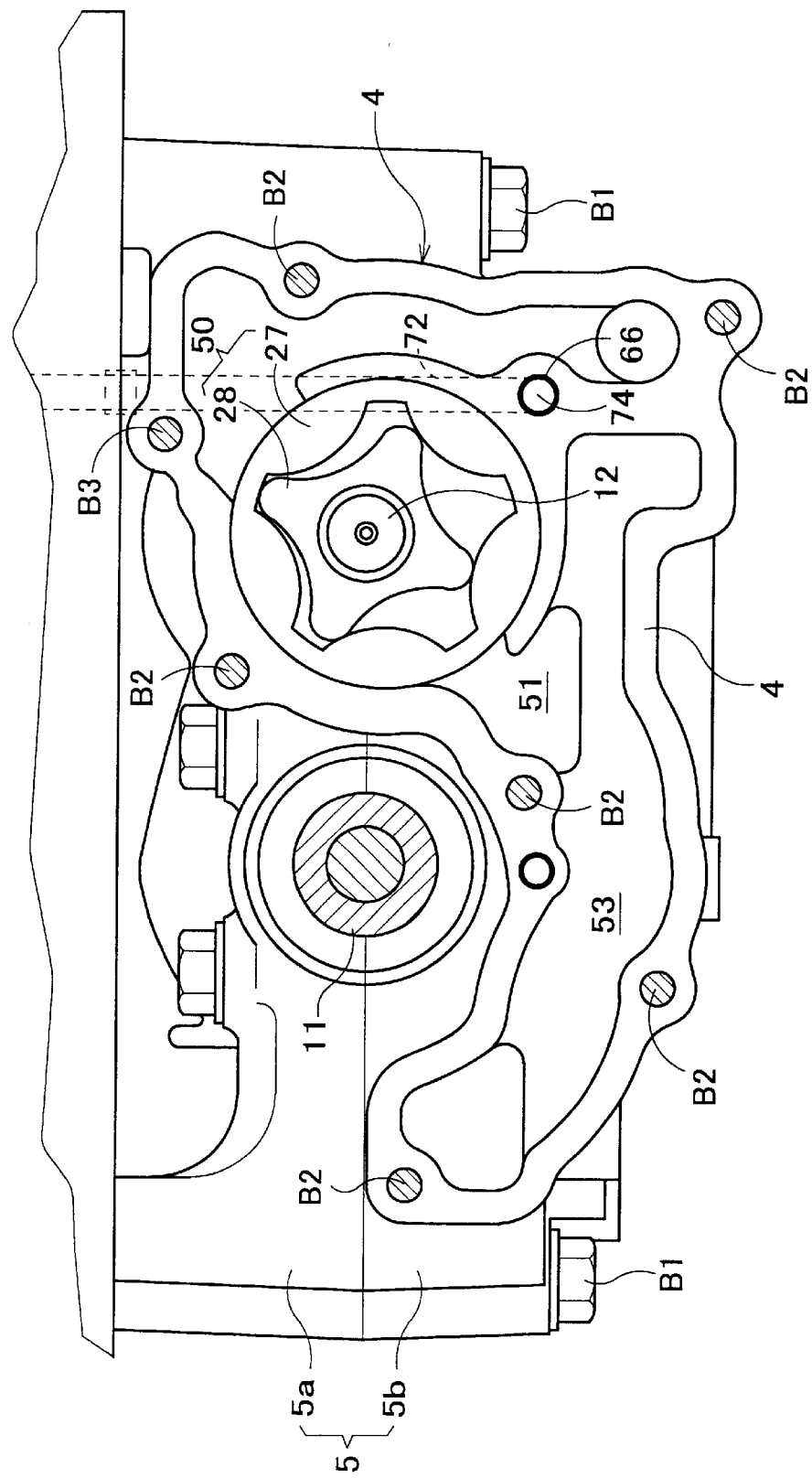
FIG. 6 is a cross section of the housing taken along line Z—Z of FIG. 2, for explaining the inner structure of the oil pump.

As shown in FIG. 1, the balancer shaft housing 5 is made up of an upper housing 5a and a lower housing 5b for convenience of assembly and maintenance (see also FIG. 2), and the upper and lower housings 5a, 5b are fastened with more than one bolt (e.g., bolts denoted by B1 in FIGS. 5 and 6). The balancer shaft housing 5 incorporates an input-side balancer shaft 11, and an output-side balancer shaft (balancer shaft) 12. Internal space of the balancer shaft housing 5 is partitioned with a pair of partition walls 7a, 7b each for the upper housing 5a and the lower housing 5b, respectively, into first balancer accommodation chambers 9a, 9b, and second balancer accommodation chambers 10a, 10b, arranged in this sequence in the axial direction.

As shown in FIG. 2, which is a cross section taken along line X—X of FIG. 1, and in FIG. 3, which is a cross section taken along line Y—Y of FIG. 1, bearing surfaces 13a, 13b for rotatably supporting the input-side balancer shaft 11 and the output-side balancer shaft (balancer shaft) 12 respectively are formed in joint surfaces of sidewalls 5c1, 5c2, and 5d1, 5d2, while a bearing surface 13c for rotatably supporting the input-side balancer shaft 11 and the output-side balancer shaft 12 is formed in joint surfaces of partition walls 7a, 7b.

Referring back to FIG. 1, the input-side balancer shaft 11 is integrally provided with a driven gear 15a, a first balancer 16a, and a second balancer 17a, and the output-side balancer shaft 12 is integrally provided with a driven gear 15b, a balancer 16b, and a balancer 17b. The driven gear 15b rotates in engagement with the driven gear 15a.

The driven gear 15a and the first balancer 16a are accommodated in the first balancer accommodation chamber 9a in such a manner that the driven gear 15a and the first balancer 16a may rotate, whereas the second balancer 17a is accommodated in the second balancer accommodation chamber 10a in such a manner that the second balancer 17a may rotate. The driven gear 15b and the first balancer 16b are accommodated in the first balancer accommodation chamber 9b in such a manner that the driven gear 15b and the first balancer 16b may rotate, whereas the second balancer 17b is accommodated in the second balancer accommodation chamber 10b in such a manner that the second balancer 17b may rotate. The first and second balancer accommodation chambers 9a, 9b are connected with each other at open adjacent sides of no sidewall where the input-side balancer shaft 11 and the output-side balancer shaft 12 may communicate with each other so that the driven gears 15a, 15b may engage with each other through the open sides and rotate synchronously.

A driven sprocket 20 is fixed on an input end of the input-side balancer shaft 11, and an endless chain 22 is wrapped on the driven sprocket 20 and a driving sprocket 21 fixed on a crankshaft 18 (see FIG. 2) of the engine E. Further, an oil pump shaft 19 rotatably supported in the oil pump housing 4 is coaxially joined to the output-side balancer shaft 12. Accordingly, as the crankshaft 18 is driven to rotate, a rotation force of the crankshaft 18 is transmitted from the input-side balancer shaft 11 through the gears 15a, 15b to the output-side balancer shaft 12, and then through the output-side balancer shaft 12 to the oil pump shaft 19, so that the oil pump shaft 19 is driven to rotate. When the input-side balancer shaft 11 and the output-side balancer shaft 12 are driven to rotate, the second balancers 16b, 17b that rotate together with the output-side balancer shaft 12, and the first balancers 16a, 17a that rotate together with the input-side balancer shaft 11 serve to cancel a secondary oscillation of the engine E derived from reciprocating motion of a piston (not shown) of the engine E. As shown in FIG. 3, an oil pump housing 4 that accommodates the oil pump shaft 19 and other elements is integrally formed at one end (left-hand end in FIG. 3) of the lower housing 5b through the housing joint portion 6. A description of the oil pump housing 4 will be given later.

Referring further to FIGS. 4 through 7, the structure of the oil pump as well as a tensioner mechanism for providing an adequate level of tension to the above endless chain 22 will be described more in detail.

Figure 4:
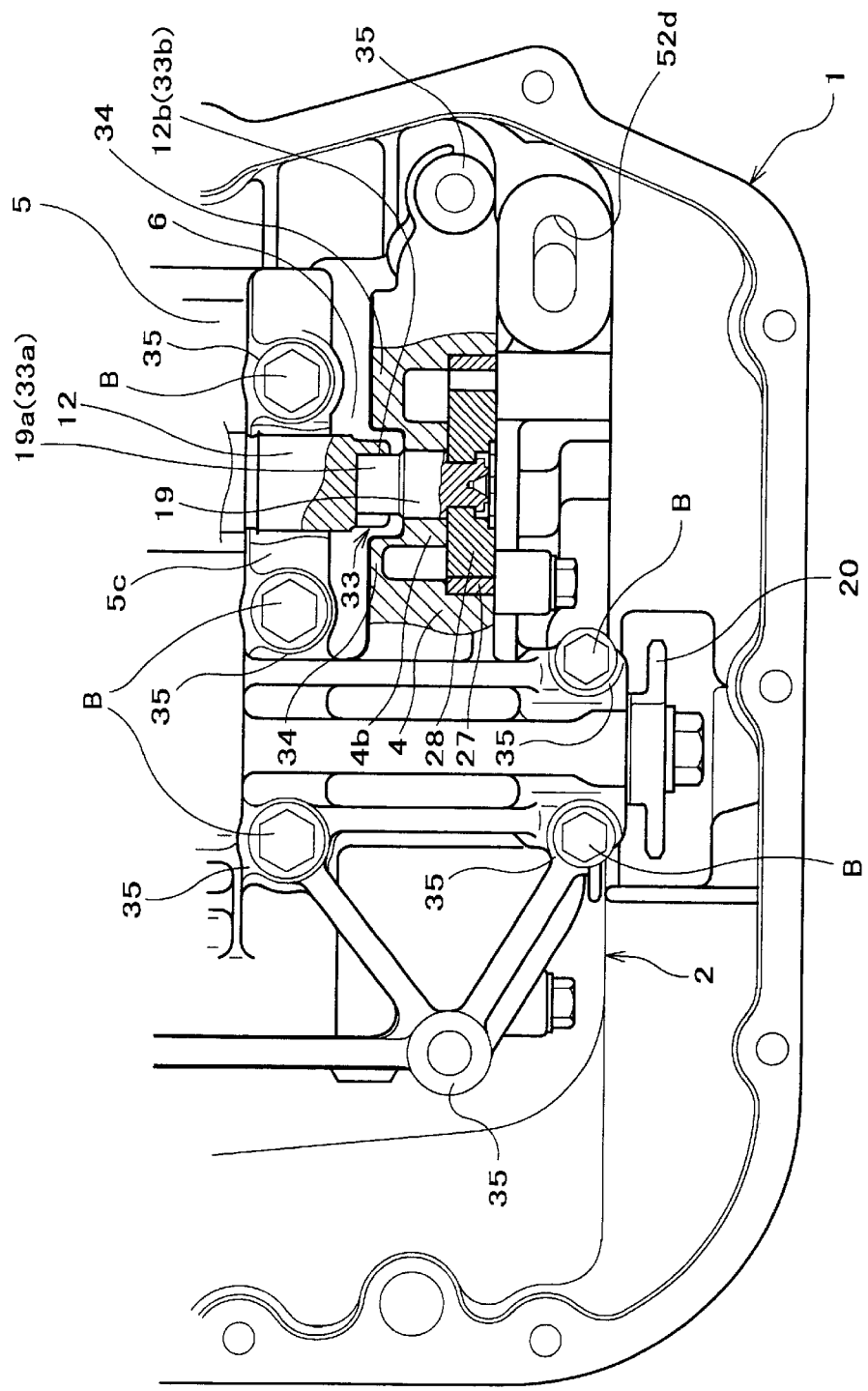
FIG. 4 is an enlarged detail view in top plan of a principal portion of the housing and the oil pan as shown in FIG. 1, for explaining a joint structure for the oil shaft and the balancer shaft.
Figure 7:
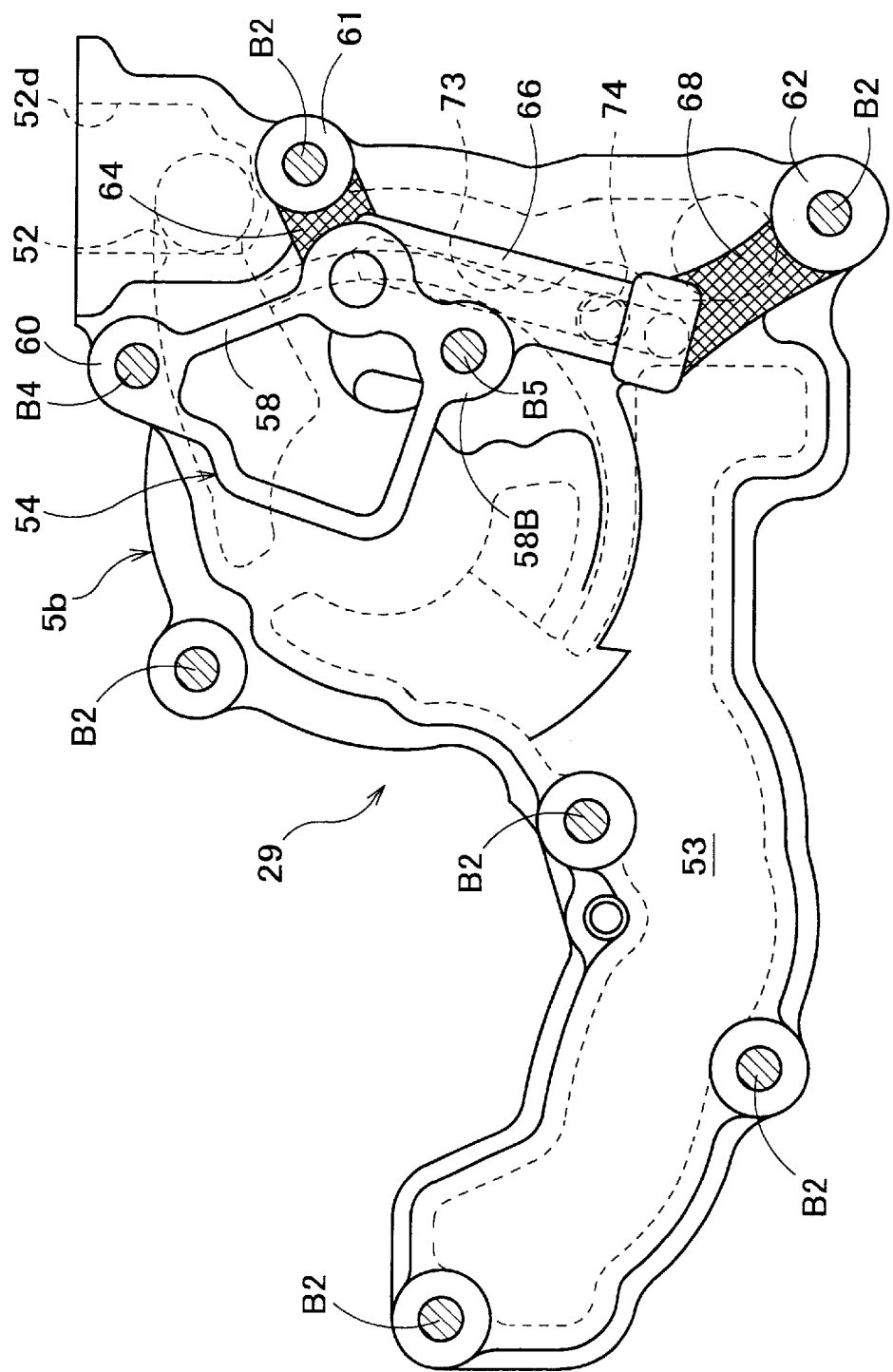
FIG. 7 is a front elevation of an oil pump housing and a tensioner mount portion, as viewed from the direction indicated by the arrow F in FIG. 1.
Figure 8:
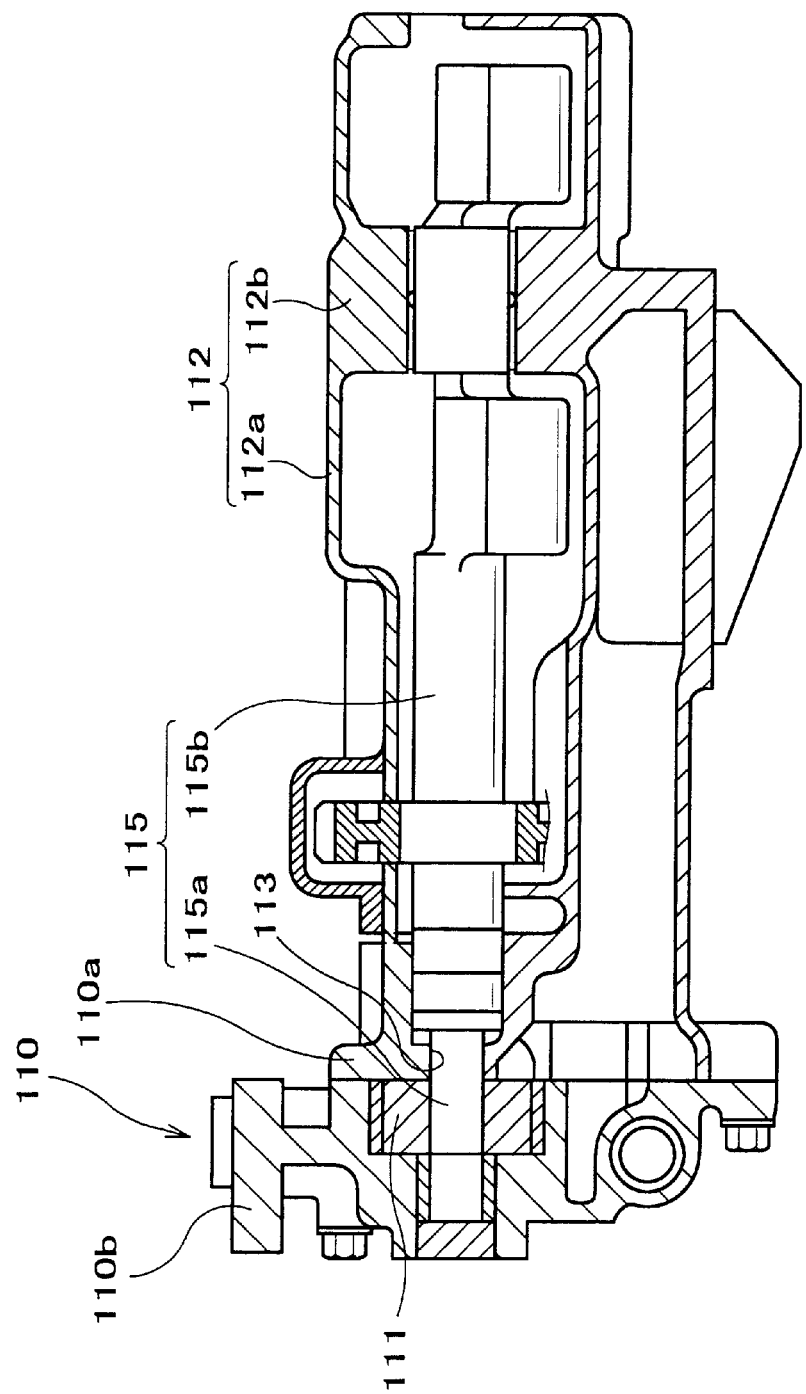
FIG. 8 is a cross section of a conventional joint structure for an oil pump shaft and a balancer shaft.

FIG. 4 is an enlarged detail view in top plan of a principal portion of the housing and the oil pan as shown in FIG. 1, for explaining a shaft joint portion where the oil pump shaft and the balancer shaft joins together. FIG. 5 is a front elevation of the housing attached to the engine, as viewed from the direction indicated by an arrow F in FIG. 1, with an endless chain wrapped on a sprocket, and a tensioner attached to the housing. FIG. 6 is a cross section of the housing taken along line Z—Z of FIG. 2, for explaining the inner structure of the oil pump. FIG. 7 is a front elevation of an oil pump housing and a tensioner mount portion, as viewed from the direction indicated by the arrow F in FIG. 1.

Is The oil pump housing 4 has a principal portion (accommodating an oil pump body 50) thereof provided at the left side as viewed from the balancer shaft housing 5 (the right side in FIG. 6) where the output-side balancer shaft 12 is provided, as shown in FIG. 1. As shown in FIG. 6, the oil pump housing 4 is so shaped that a half at the output-side balancer shaft 12 side thereof upwardly protrudes toward the upper housing 5a. As shown in FIGS. 3 and 5, a pump cover 29 is integrally joined on an open end of the oil pump housing 4 with a plurality of bolts B2, and the above oil pump housing 4 together with the pump cover 29 accommodates the oil pump body 50. As shown in FIG. 3, the oil pump body 50 (denoted by 27 and 28 in FIG. 3; see also FIG. 6) is provided at one end of the output-side balancer shaft 12 extending into the oil pump housing 4. The oil pump body 50, which is exemplified by a trochoid pump as known in the art, is comprised of an inner rotor 28 fixed at the one end of the output-side balancer shaft 12, and an outer rotor 27 rotatably supported in the oil pump housing 4 and engaged with the inner rotor 28. The outer rotor 27 of the oil pump body 50 is rotatably fitted in an inner cylindrical surface of a pump chamber 24, and the inner rotor 28 is incorporated in the outer rotor 27. An opening of the pump chamber 24 is openably covered with the pump cover 29. A bearing hole 30 for supporting the oil pump shaft 19 integrally joined to the inner rotor 28 is formed in a sidewall 4b of the oil pump housing 4 opposite the balancer shaft housing 5 (see FIG. 3).

The housing joint portion 6 joins the oil pump housing 4 and the lower housing 5b of the balancer shaft housing 5 together at the bottom of the oil pump housing 4. In the housing joint portion 6 is provided a relief passage 31 connected to the pump chamber 24, and a relief valve 32 is put in the relief passage 31.

The relief valve 32 is designed to open to relieve pressure beyond a specific pressure lower than that which could damage the oil pump as a whole.

In FIG. 2, denoted by 40 is an oil supply passage for supplying oil to each section to be lubricated in the engine E; denoted by 41 is an oil strainer that is an inlet of an oil suction passage through which oil is sucked into the pump chamber 24.

The oil strainer 41 is provided at the bottom of the lower housing 5b, as shown in FIG. 2, where the oil strainer 41 is immersed in lubricating oil stored in the oil pan 1. The oil strainer 41 and a suction port 51 of the oil pump are connected with each other through an oil passage 53 integrally formed at the bottom of the lower housing 5b as shown in FIGS. 5 and 6. The oil strainer 41 serves to filter lubricating oil stored in the oil pan 1, and any filtering device known in the art may be used therefor. A tubular oil discharge port 52 of the oil pump is connected as usual through an oil passage to a main gallery (not shown) provided in a cylinder block of the engine E.

As shown in FIG. 7, the pump cover 29 integrally joined to an open end surface of the oil pump housing 4 with a number of bolts B2 is provided with a tensioner mount portion 54 integrally formed at a rightward section of the pump cover 29 as viewed from the direction indicated by the arrow F in FIG. 1 which rightward section corresponds to the first and second balancer accommodation chambers 9a, 10a in which the output-side balancer shaft 12 is located. The tensioner mount portion 54 is designed to enhance stiffness of the oil pump housing 4, and also serves to enhance stiffness of a tensioner Te itself mounted on the tensioner mount portion 54. To be more specific, an upper boss 60 for fastening the oil pump housing 4, the pump cover 29 and a tensioner body 56 (see FIG. 5) together with a bolt B4, a middle boss 61 and a lower boss 62 each for fastening the oil pump housing 4 and the pump cover 29 with bolts B2 are provided in such a manner that three bosses 60, 61, 62 are integrally formed at three spots along the outer edge of the pump cover 29 which spots are so located as to form vertices of a triangle. A closed belt-like mount block 58 is a principal element of the tensioner mount portion 54, and is provided for fastening the tensioner body 56 in a position inside a line joining the upper and middle bosses 60 and 61. The mount block 58 and the middle boss 61 are integrally formed with each other using a first stiffening rib 64. Further, a tubular oil conduit 66 for supplying oil to the tensioner Te is integrally formed outside the mount block 58 in a direction extending downwardly from the mount block 58. This tubular oil conduit 66 serves to enhance stiffness of the mount block 58. Moreover, the oil conduit 66 and the lower boss 62 are integrally joined with a second reinforcing rib 68. Consequently, the reinforced tensioner mount portion 54 is integrally formed on the outer surface of the pump cover 29, and thereby the pump cover 29, particularly the tubular oil discharge port 52 provided in the pump cover 29, is reinforced by the tensioner mount portion 54, exhibiting a conspicuously improved stiffness.

As shown in FIG. 5, the tensioner body 56 of the tensioner Te is fixed on the closed belt-like mount block 58 of the tensioner mount portion 54. More specifically, an upper portion of the tensioner body 56 is fastened together with the oil pump housing 4 and the pump cover 29 by fitting the bolt B4 into the upper boss 60, while a lower portion of the tensioner body 56 is fastened by fitting a bolt B5 into a boss 58B provided in the closed belt-like mount block 58. The tensioner body 56 is provided with a tensioning element 70 that may retractably protrude toward a slack of the endless chain 22. The tensioning element 70 is designed to automatically move to and fro with an adjustment made through hydraulic control using oil supplied to an oil passage in the tensioner body 56. As shown in FIGS. 5 and 6, lubricant oil that has lubricated each section to be lubricated in the engine E passes through oil passages 72, 74 and 73, and is introduced into the tensioner body 56. The lubricant oil is then supplied to the tensioning element 70, exerting control over to-and-fro movement of the tensioning element 70.

As clearly shown in FIG. 5, a shoe 76 is swingably pivoted on a lower portion of the engine E, and a front surface of the shoe 76 disposed between the tensioning element 70 and a slack of the endless chain 22 is pressed into contact with a slack of the endless chain 22 to keeps the endless chain 22 under a specific tension.

The control over the to-and-fro movement of the tensioner Te through controlled hydraulic pressure may be performed by any means known in the art, and thus a detailed description will be omitted.

As described above, the oil pump housing 4 provided at an end surface of the balancer shaft housing 5 of the engine E is reinforced in that the outer surface of the pump cover 29, and particularly the oil discharge port 52, is reinforced by the tensioner mount portion 54 formed on the pump cover 29. Moreover, since the tensioner body 56 provided with the tensioning element 70 is fixed on the tensioner mount portion 54, the oil pump and the tensioner Te are reinforced by each other, and thus rigidity thereof can be considerably enhanced, so that the expected performance of the oil pump and the tensioner Te can be guaranteed over a prolonged period of time.

As clearly shown in FIG. 4, the oil discharge port 52 is formed to have an outlet 52d thereof oriented in a direction perpendicular to a longitudinal direction (along the crank shaft 18) of the engine E and to have a substantially rectangular cross section which is compressed in the longitudinal direction of the engine E. Therefore, an amount of overhanging of the endless chain line, i.e., the distance from the pump cover 29 to a position of the endless chain 22 wrapped on the sprocket 20 can be reduced.

In operation, when the engine E is actuated and the crankshaft 18 is driven to rotate, the rotation of the crankshaft 18 is transmitted through the driving sprocket 21, the endless chain 22, and the driven sprocket 20, to the input-side balancer shaft 11. The rotation of the balancer shaft 11 is then transmitted through the gears 15a and 15b, to the output-side balancer shaft 17. Hereupon, the number of teeth of the driving sprocket 21 is designed to be twice larger than that of the driven sprocket 20, while the gear ratio of the gear 15a is designed to be equal to that of the gear 15b. Thus, the input-side balancer shaft 11 and the output-side balancer shaft 12 rotate in the directions reverse to each other at the rotational speed twice as fast as that of the crankshaft 18. The first balancers 16a, 17a and the second balancers 16b, 17b provided on the input-side balancer shaft 11 and the output-side balancer shaft 12 respectively serve to reduce the secondary oscillation of the engine E. The rotation of the output-side balancer shaft 12 makes the oil pump 50 joined to the end portion of the output-side balancer shaft 12 rotate, and the rotation of the oil pump 50 makes lubricant oil in the oil pan 1 filtered through the oil strainer 41 and sucked to flow through the engine E and lubricate each section to be lubricated in the engine E. Part of oil that has been used for lubrication is led to the oil passage 72 (see FIG. 6), passing through the oil passages 74 and 73 to reach the control oil passage in the tensioner Te, in which the lubricant oil is used to automatically operate the tensioner, Te to give a specific tension to the endless chain 22.

A description will be given of a housing joint portion that joins the oil pump housing and the balancer shaft housing with a predetermined spacing allowed therebetween, and a shaft joint portion provided above the housing joint portion, with reference mainly to FIGS. 3 and 4.

An input end (end portion) 19a of the oil pump shaft 19 is, as shown in FIGS. 3 and 4, pierces through the sidewall 4b of the oil pump housing 4 from the inside to the outside of the oil pump housing 4, whereas an output end 12b of the output-side balancer shaft 12 pierces through the sidewall 5c1–5c2 of the balancer shaft housing 5, which forms a bearing portion for the output-side balancer shaft 12, from the inside to the outside of the balancer shaft housing 5 toward the sidewall 4b of the oil pump housing 4.

The sidewall 4b of the oil pump housing and the sidewall 5c1–5c2 of the balancer shaft housing 5 are separated with a predetermined spacing allowed therebetween by interposing the housing joint portion 6 so that a joining operation of the oil pump shaft 19 and the output-side balancer shaft 12 can be made easier. Moreover, the housing joint portion 6 is open for visual inspection of an operator from upward so that workability during the joining operation may be improved due to viewability of the housing joint portion 6. Further, on the sidewall 4b of the oil pump housing 4, at an outer surface thereof opposite the bearing portion of the balancer shaft housing 5, protuberances 34, 34 that protrude toward the balancer shaft housing 5 are formed at both sides of the input end 19a of the oil pump shaft 19.

The protuberances 34, 34 extend upwardly from a distal end thereof connected with the housing joint portion 6 to a top inner surface of the oil pump housing 4 so as to guide the output end 12b of the output-side balancer shaft 12 into the input end 19a of the oil pump shaft 19. The distance between opposed surfaces of the protuberances 34, 34 is so determined that an engageable portion 33b of the output-side balance shaft 12 may be guided through the opposed surfaces of the protuberances 34, 34 to engage with an engageable portion 33a of the oil pump shaft 19 when the output-side balancer shaft 12 is fitted to get joined to the oil pump shaft 19. The length of a joint portion 33 where the both engageable portions 33a and 33b are engaged is so determined that the joint portion 33 between the input end 19a of the oil pump shaft 19 and the output end 12b of the output-side balancer shaft 12 may be fitted and positioned appropriately between the opposed surfaces of the sidewall 4b of the oil pump housing 4 and the sidewall 5c1–5c2 of the balancer shaft housing 5.

The joint portion 33 is, more specifically, comprised of a pair of engageable portions 33a and 33b; the engageable portion 33a of the oil pump shaft 19 and the engageable portion 33b of the output-side balancer shaft 12 may be disengageably engaged in a radial direction with each other. The engageable portion 33a of the oil pump shaft 19 is in the shape of a rectangular parallelepiped, while the engageable portion 33b of the output-side balancer shaft 12 is in a cross-sectionally U-shaped concavo-convex shape so that the engageable portion 33b may be fitted on the rectangular parallelepiped engageable portion 33a of the oil pump shaft 19 in a disengageable manner. The position of the engageable portion 33a of the oil pump shaft 19 in radial directions and the position of the engageable portion 33b of the output-side balancer shaft 12 in radial directions are each determined so that a rotation balance of the oil pump shaft 19 including the inner rotor 28 and a rotation balance of the output-side balancer shaft 12 may serve to cancel a secondary oscillation of the engine E. The depth of the engageable portion 33b of the output-side balancer shaft 12 is determined at a dimension that may allow the rectangular parallelepiped engageable portion 33a of the oil pump shaft 19 to be coaxially joined to the engageable portion 33b.

The above pair of protuberances 34, 34 may protrude to such an extent that the joint portion 33 comprised of the engageable portion 33a of the oil pump shaft 19 and the engageable portion 33b of the output-side balancer shaft 12 may be, wholly or not, accommodated (disposed) in the space between the protuberances 34, 34 so that the pair of protuberances 34, 34 may lap the engageable portion 33b provided at the end of the output-side balancer shaft 12 in the axial directions of the balancer shaft 12.

Thus-designed oil pump makes it possible to utilize space at both sides of the output-side balancer shaft 12 to form the oil pump housing 4, thus serving to realize a compact and lightweight body of the oil pump. In other words, the empty space left at the sides of the output-side balancer shaft 12 is effectively utilized to increase the capacity of the oil pump housing 4, and the length of the oil pump housing 4 in the axial direction of the oil pump shaft 19 can thereby be shortened for that portion, so that miniaturization and weight reduction of the oil pump housing 4 may be achieved.

As described above, with the housing 2 according to the present embodiment, a simple operation that can be performed only by inserting the engageable portion 33b of the output-side balancer shaft (balancer shaft) 12 into the space between the protuberances 34, 34 of which the opposed surfaces serve to guide the engageable portion 33b toward the engageable portion 33a of the oil pump shaft 19 so that the engageable portion 33b may be easily and neatly fitted into the engageable portion 33a, which is followed by another simple operation that can be performed only by placing the upper housing 5a of the balancer shaft housing 5 on the lower housing 5b thereof and screwing and fastening bolts B inserted in an insertion hole of each fastening boss 35 provided on in the upper housing 5a in screw holes (not shown) provided in the lower housing 5b allows the output-side balancer shaft (balancer shaft) 12 to be joined to the oil pump shaft 19. Consequently, the operation time can be considerably shortened.

In this embodiment, since each fastening boss 35 of the balancer shaft housing 5 is provided outside the protuberances 34, 34 so as to facilitate engagement operation of the engageable portion 33b of the output-side balancer shaft 12, the engaging and disengaging operation between the engageable portion 33a of the oil pump shaft 19 and the engageable portion 33b of the output-side balancer shaft 12 can be performed with ease. In FIGS. 3 and 4, the output-side balancer shaft 12 is illustrated as being turned upside down with an engaging opening of the engageable portion 33b of the output-side balancer shaft 12 oriented upward, for purposes of description.

Although the preferred embodiments of the present invention have been described above, the present invention is not limited to the illustrated embodiments, and various modifications and changes may be made in the present invention without departing from the spirit and scope thereof.

For example, in the present embodiment, the engageable portion 33a of the oil pump shaft 19 is in the shape of a rectangular parallelepiped, and the engageable portion 33b of the output-side balancer shaft 12 is a cross-sectionally U-shaped concavo-convex shape so that the engageable portion 33b may be fitted on the rectangular parallelepiped engageable portion 33a of the oil pump shaft 19 in a disengageable manner. However, the engageable portion 33b of the output-side balancer shaft 12 may be made in the shape of a rectangular parallelepiped, and the engageable portion 33a of the oil pump shaft 19 may be made in a cross-sectionally U-shaped concavo-convex shape so that the engageable portion 33a of the oil pump shaft 19 may be fitted on the rectangular parallelepiped engageable portion 33b of the output-side balancer shaft 12. As far as a sufficient stiffness can be achieved, the engageable portion 33a or 33b having a concavo-convex shape may be in the shape of a slot.

Further, in the present embodiment, as described above, the sidewalls 5c1, 5c2, 5d1, 5d2 of the balancer shaft housing 5, and the partition walls 7a, 7b in the balancer shaft housing 5 are provided with the bearing surfaces 13a, 13b, 13c which serve to rotatably support the input-side balancer shaft 11 and the output-side balancer shaft 12. However, as far as forced lubrication can be secured of the input-side balancer shaft 11 and the output-side balancer shaft 12, separable bearing portions may be arranged in parallel so that an upper portion of the balancer shaft housing 5 may be opened.

In addition, a rotation driving force is transmitted from the output-side balancer shaft 12 to the oil pump shaft 19 in the present embodiment, as described above, but conversely, the oil pump shaft 19 may be driven by an engine, and a rotation driving force may be transmitted through the output-side balancer shaft 12 to the input-side balancer shaft 11.

Moreover, though a transmission mechanism constructed of an endless chain and sprockets is used in the above embodiment, any other transmission mechanism that can exerts the same effects such as an endless cog belt and cog pulleys may be used.

As may be apparent from the above description, the present invention exerts the following advantageous effects.

Since a joint portion where the oil pump shaft and the balancer shaft join together is provided between the opposed surfaces of the oil pump housing and the bearing portion, the joint portion of the oil pump shaft and the balancer shaft can be seen from the outside. Further, phase angles of the oil pump shaft and the balancer shaft with respect to the rotation balance therebetween are predetermined, and thus an undesirable shift relative to each other that could occur during a joining operation can be prevented.

Provision of a pair of protuberances that guide the engageable portion of the balancer shaft to the engageable portion of the oil pump shaft allows an operator to easily position the engageable portion of the balancer shaft in front of the engageable portion of the oil pump for the fitting operation. Further, space between the protuberances is open to the operator so that the operator can see and fit the engageable portion of the balancer shaft into the engageable portion of the oil pump shaft with the help of the opposed surfaces of the protuberances serving as a guide.

Moreover, the above pair of protuberances that may preferably be designed to lap the engageable portion of the balancer shaft in axial directions of the balancer shaft allows the oil pump housing to be formed utilizing space at both sides of the balancer shaft, contributing to the miniaturization and weight reduction of the oil pump.

Since the above bearing portion may be designed to be separable into a first part and a second part, only attaching the second part to the first part provided with the housing joint portion after engaging the balancer shaft with the oil pump shaft can finalize a joining operation of the oil pump shaft and the balancer shaft, and thus can considerably improve total operating efficiency.

Furthermore, since the first and second parts of the bearing portion that may be fastened together with a bolt fitted in a boss, and the boss may be provided outside the protuberances, the operator can more easily perform the operation of fitting the engageable portion of the balancer shaft into the engageable portion of the oil pump shaft.

What is claimed is:

1. A joint structure for an oil pump shaft and a balancer shaft in which the balancer shaft is coaxially joined to an end portion of the oil pump shaft, the joint structure comprising:

an oil pump housing from which the end portion of the oil pump shaft protrudes;

a bearing portion in which the balancer shaft is supported; and a housing joint portion that joins the oil pump housing and the bearing portion with a predetermined spacing allowed therebetween, wherein the housing joint portion is provided below a shaft joint portion where the oil pump shaft and the balancer shaft join together; and wherein the predetermined spacing is set so that the shaft joint portion is disposed between opposite surfaces of the oil pump housing and the bearing portion.

2. A joint structure for an oil pump shaft and a balancer shaft according to claim 1, wherein the shaft joint portion is comprised of a pair of engageable portions of the oil pump shaft and the balancer shaft, the engageable portions being engageable with each other in a radial direction thereof; and wherein a pair of protuberances that guide the engageable portion of the balancer shaft to the engageable portion of the oil pump shaft to make the engageable portions engaged with each other are provided on the surface of the oil pump housing opposite to the bearing portion of the balancer shaft in such a manner that the protuberances sandwich the end portion of the oil pump shaft.

3. A joint structure for an oil pump shaft and a balancer shaft according to claim 2, wherein the pair of protuberances lap the engageable portion of the balancer shaft in axial directions of the balancer shaft.

4. A joint structure for an oil pump shaft and a balancer shaft according to claim 1, wherein the bearing portion is separable into a first part and a second part.

5. A joint structure for an oil pump shaft and a balancer shaft according to claim 4, wherein the first and second parts of the bearing portion are fastened together with a bolt fitted in a boss provided outside the protuberances.

6. A joint structure for an oil pump shaft and a balancer shaft according to claim 1, further comprising:

a pump cover openably attached to the oil pump housing;

a tubular oil discharge port provided in the pump cover; and a tensioner that provides a predetermined level of tension to an endless chain in a gearing for transmitting a driving force from a crank shaft of an engine to the oil pump shaft, wherein a tensioner body of the tensioner is integrally mounted on a tensioner mount portion that is integrally formed on a periphery of the tubular oil discharge port.

7. A joint structure for an oil pump shaft and a balancer shaft according to claim 6, wherein the tubular oil discharge port is formed to have an outlet thereof oriented in a direction perpendicular to a longitudinal direction of the engine and to have a shape compressed in the longitudinal direction of the engine.

* * * * *